United States Patent [19]

Schlueter et al.

[11] Patent Number: 4,930,297
[45] Date of Patent: Jun. 5, 1990

[54] TELESCOPING BASKET FOR A COTTON HARVESTER

[75] Inventors: Francis E. Schlueter, Des Moines; Kenneth C. McConnell, Ankeny; Steve A. Junge, Johnston; Steve H. McBee, Ankeny, all of Iowa

[73] Assignee: Deere & Company, Moline, Ill.

[21] Appl. No.: 255,937

[22] Filed: Oct. 11, 1988

[51] Int. Cl.$^5$ .................. A01D 85/00; A01D 87/00; A01D 90/00

[52] U.S. Cl. .......................... 56/16.6; 56/28; 56/344; 298/11; 298/18; 298/22 C; 298/22 P

[58] Field of Search ............ 56/16.6, 28, 30, 202, 56/344–347, DIG. 5, DIG. 11; 298/11, 18, 22 P, 22 C; 414/470, 471, 488

[56] References Cited

U.S. PATENT DOCUMENTS

| | | | |
|---|---|---|---|
| 2,862,342 | 12/1958 | Fergason | 56/16.6 |
| 3,744,228 | 7/1973 | Lundahl | 56/344 |
| 3,813,861 | 6/1974 | Wood | 56/344 |
| 3,880,468 | 4/1975 | Steingas et al. | 298/11 |
| 3,886,719 | 6/1975 | Garrison et al. | 56/344 |
| 3,901,142 | 8/1975 | Wood | 56/344 |
| 3,965,660 | 6/1976 | Kanengieter et al. | 56/346 |
| 3,968,634 | 7/1976 | Anderson et al. | 56/344 |
| 4,005,565 | 2/1977 | Lowe et al. | 56/344 |
| 4,059,942 | 11/1977 | Trimble et al. | 56/30 |
| 4,341,423 | 7/1982 | Fachini et al. | 298/18 |
| 4,519,189 | 5/1985 | Fachini et al. | 56/16.6 |
| 4,662,160 | 5/1987 | Hubbard et al. | 56/16.6 |
| 4,706,710 | 11/1987 | Meyer et al. | 137/625.47 |
| 4,793,126 | 12/1988 | Wood et al. | 56/16.6 |

*Primary Examiner*—Bruce M. Kisliuk

[57] ABSTRACT

Cotton harvester basket structure including an upper basket portion telescopingly received within a lower basket portion and first hydraulic actuators for moving the basket between harvesting and dump positions and second actuators for telescoping the basket portions between a retracted storage position and an extended field-working position. An unloading conveyor and compacting augers are connected to and movable with the upper basket portion, and the compacting augers also serve to meter cotton during the dump cycle. Telescoping cotton conveying ducts are movable with the upper basket portion between retracted transport and raised field-working positions. Hydraulic circuitry includes valves for selectively controlling the basket telescoping and dump functions and the conveyor and compacting auger operations.

32 Claims, 5 Drawing Sheets

TELESCOPING BASKET FOR A COTTON HARVESTER

BACKGROUND OF THE INVENTION

The present invention relates generally to cotton harvesters, and more specifically to a harvester basket which includes an upper portion which may be lowered to reduce the transport height of the harvester, and to hydraulic circuitry controlling the basket and the compacting and conveying structure associated with the basket.

Modern high capacity cotton harvesters are typically very large structures and include a high volume basket. Because of shipping size limitations, present production cotton harvesters such as the John Deere 9950 Cotton Picker must be transported with a substantial portion of the basket un-assembled. Basket extension and basket conveyor parts bundles must be assembled by the dealer or ultimate user. In addition, if the harvester is shipped by truck, the basket lid has to be removed. Once a customer has received the assembled machine, he may find it difficult to transport the machine to certain locations because of its height. Moving the machine indoors for repair or storage is often a problem with the basket fully assembled on the harvester.

The disassembly of portions of the harvester prior to shipping as well as the need for the dealers to spend many hours setting up the basket conveyor and basket extension are significant disadvantages to the present arrangement. A custom operator, for example, who moves his cotton harvester from location to location often must have special lift equipment and must spend considerable time in tear down and setup of the basket, thereby reducing the overall productivity of his machine. Although structure with a telescoping roof section such as shown in U.S. Pat. No. 4,519,189 has been proposed to reduce basket height for transport and long-term storage, such structure requires the disassembling of bolts and refastening of cylinder piston rods which adds to the time and effort required to make the basket transitions. Adding hydraulic actuators and controls can significantly increase the cost and complexity of the hydraulic system on the harvester.

To optimize basket capacity, the cotton conveying ducts extend to the top forward portion of the basket, and compacting structure located in the basket compresses the relatively fluffy cotton. The height of the ducts can exceed the desired transportation height, and relocating the compacting structure can be difficult during assembly and disassembly of the basket. In addition, maintaining a good even flow of cotton from the basket during dumping remains a problem.

BRIEF SUMMARY OF THE INVENTION

It is therefore an object of the present invention to provide improved basket structure for a cotton harvester. It is another object to provide such a basket structure which facilitates harvester shipping and transport, and which obviates the need for assembly and disassembly of parts of the basket structure and for special on-site assembly equipment. It is yet a further object to provide such a basket structure which has a relatively high cotton capacity and yet which provides a relatively low profile for easy transport and access to storage and repair facilities. It is yet a further object to provide such a basket assembly having a telescoping upper basket portion with an unloading conveyor connected to and movable with the upper basket portion.

It is still a further object of the invention to provide an improved basket assembly for a cotton harvester which is movable relatively quickly and easily between an extended field-working position and a compact storage or transport position. It is another object to provide duct structure for a basket assembly which can also be moved quickly and easily between raised and lowered positions for harvesting and transport, respectively.

It is a further object to provide an improved basket assembly having enhanced filling, loading and unloading capabilities. It is yet another object to provide such an assembly having a telescoping top portion for reducing the height of the harvester for storage or transport.

It is still a further object of the present invention to provide an improved and relatively simple hydraulic actuating system which is operable to selectively actuate basket lift cylinders and basket telescoping cylinders of a cotton harvester basket assembly. It is a further object to provide such a system which in combination with a telescoping basket obviates the need for on-site basket assembly and wherein either the basket lift or telescoping function may be easily selected by the operator from the operator cab. It is a further object to provide such a system which includes a diverter valve and two operator control valves connected to the diverter valve for selecting and activating or locking out various control functions associated with the basket.

It is still a further object of the present invention to provide an improved cotton harvester basket which telescopes between a compact transport or storage position and a relatively high capacity extended position and which includes improved structure for compacting the cotton in the basket and for dumping the cotton from the basket. It is a further object to provide such a structure which includes compacting conveyors and an unloading conveyor connected to the telescoping top portion of the basket for movement therewith between the extended operating and compact storage positions. It is yet another object to provide improved hydraulic circuitry for controlling movement of the basket as well as operation of the conveyor and compactor.

It is another object to provide an improved basket assembly for a cotton harvester including compacting structure which is activated during basket dumping to help meter the cotton uniformly to the module builder or transport wagon.

In accordance with the above objects, a cotton harvester basket assembly constructed with the teachings of the present invention includes a lower basket portion connected to the cotton harvester main frame for movement between dump and harvesting positions by basket lift cylinders. The lower basket portion is generally rectangular in configuration and slidingly receives an upper basket portion which is movable vertically by a pair of basket telescoping cylinders connected in series with each other. An unloading conveyor and compacting augers are hydraulically driven and connected to the upper basket portion for movement therewith as the upper basket portion is telescoped relative to the lower basket portion. One of the compacting augers is located near the top of the discharge opening to help meter cotton uniformly during dumping. A second compacting auger is attached to the pivoting lid and rocks outwardly with the lid to allow a sufficient opening during dumping. The second auger is driven by a separate hydraulic motor to also help break up large clumps of cotton for improved dumping. Separate lift cylinders are utilized to move the basket between the transport and dump positions, and a unique and relatively simple hydraulic control circuit permits the operator to select telescoping, dumping and cotton compacting and metering functions from the harvester cab and prevents simultaneous operation of several of the functions. The various functions may be locked out for service and repair of the harvester.

When telescoped to the extended field-working position, the basket has a relatively high capacity and in combination with the compacting structure permits a large volume of cotton to be harvested before the basket must be dumped. The conveyor provides good unloading characteristics when the basket is in the dump position and moves with the upper basket portion into a compact storage or transport position. Telescoping ducts supported by a connecting member extending transversely between the ducts are selectively connectible to the upper basket portion for movement therewith between a lowered transport position and a raised field-working position.

These and other objects, features and advantages of the present invention will become apparent to those skilled in the art from the description which follows and from the drawings.

DESCRIPTION OF THE PREFERRED EMBODIMENT

Figure 1:
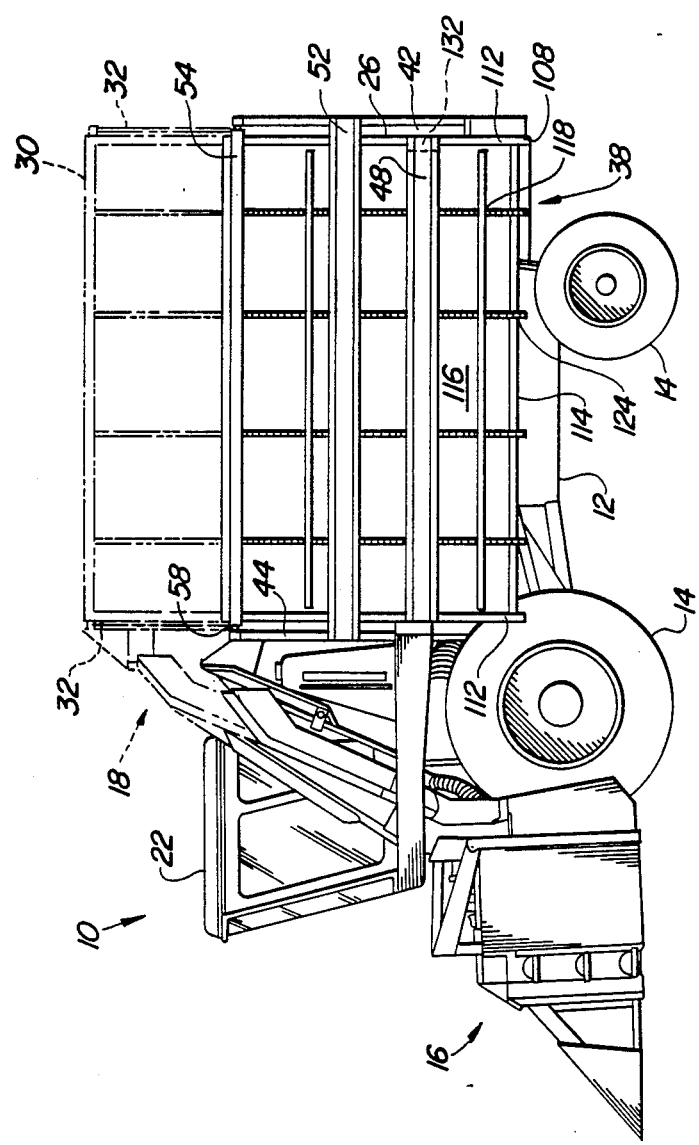
FIG. 1 is a side view of a cotton harvester with the basket assembly present invention attached thereto.

Referring to FIG. 1, there is shown a cotton harvester 10 having a main frame 12 supported for forward movement over the ground by wheels 14. Cotton harvesting structure 16 is supported from the forward end of the main frame for removing cotton from rows of cotton plants, and air duct structure 18 is provided for directing the harvested cotton upwardly and rearwardly to basket structure 20 (FIG. 5) supported on the main frame 12 behind a cab 22. With the exception of the basket structure and the hydraulic control circuit therefore which will be discussed in detail below, the harvester 10 is generally of conventional construction and may be of the type exemplified by the commercially available John Deere Model 9950 four-row cotton harvester.

Figure 3:
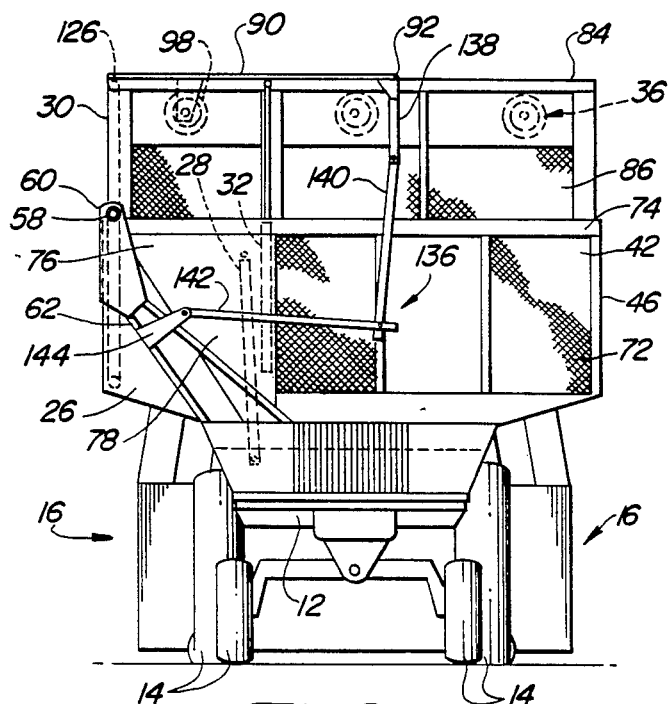
FIG. 3 is a view similar to FIG. 2 but showing the basket in the extended field-working position.
Figure 4:
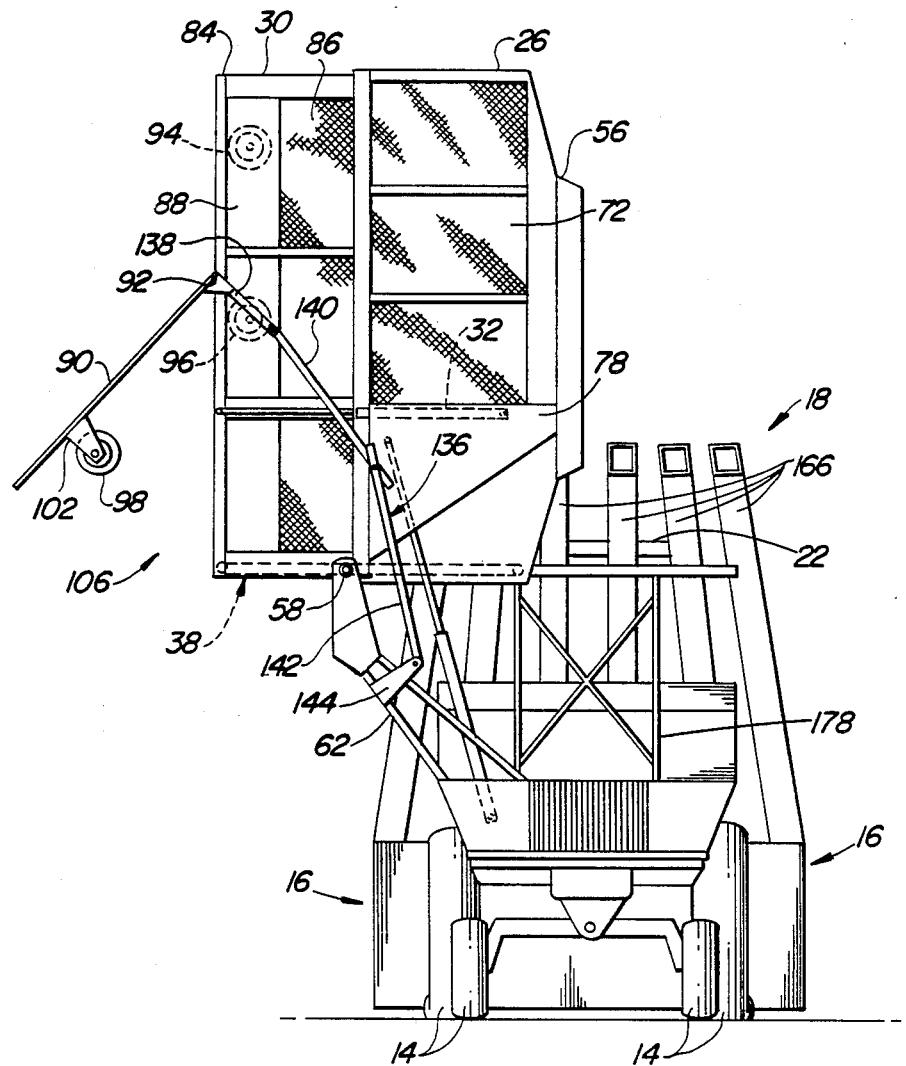
FIG. 4 is a view similar to FIG. 3 but showing the basket in the dump position.
Figure 6:
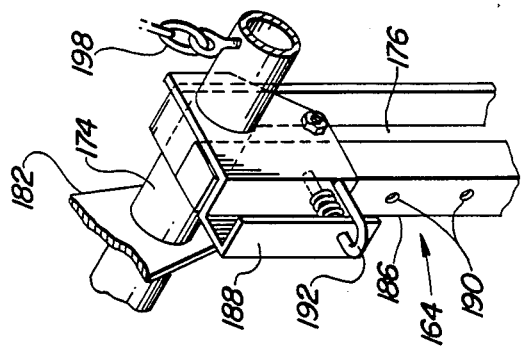
FIG. 6 is an enlarged perspective view of the locking mechanism for securing the upper duct portions of the telescoping ducts in preselected positions relative to the corresponding lower duct portions.

The basket structure 20 includes a lower basket portion 26 supported on the main frame 12 and movable by front and rear hydraulic basket lift cylinders 28 (FIGS. 2 and 3) between a field-working position (FIGS. 1 and 3) and a raised dump position (FIG. 4). The basket structure 20 also includes an upper basket portion 30 slidably received within the walls of the lower basket portion 26 for telescoping with respect thereto by front and rear hydraulic basket telescoping cylinders 32 between a lowered storage or transport position (solid lines of FIG. 1 and FIG. 2) and a raised field-working position (broken lines of FIG. 1 and FIG. 3). The upper basket portion 30 supports compacting auger structure 36 and an unloading conveyor 38 for movement vertically with the upper portion 30 as the cylinders 32 are actuated.

The lower basket portion 26 is substantially rectangular in configuration and includes an aft end wall 42 and a forward end wall 44 connected by a fore-and-aft extending right-hand (as viewed looking in the forward direction of the harvester 10) sidewall 46 located opposite the dump side of the harvester 10. The dump side edges of the walls 42 and 44 are connected by lower and upper fore-and-aft extending beams 48 and 52, respectively, and by an upper fore-and aft extending tube 54. The dump side of the lower basket portion is therefore a substantially open structure which, as will be described in detail below, is substantially closed by the unloading conveyor 38 connected to the upper basket portion 30. The lower basket portion 26 is closed by bottom structure 56 which slopes downwardly and inwardly from the sides of the basket.

Pivots 58 project axially from the ends of the upper tube 54 and are journalled in the upper ends 60 of front and rear support masts 62 for rocking by the lift cylinders 28 about a fore-and-aft extending axis between a lowered position (FIGS. 1 and 3) and a raised dump position (FIG. 4). Preferably the lower basket portion 26 includes a number of expanded metal screens 72 supported on a framework 74 which includes panel structure 76. The panel structure 76 includes a cover portion 78 which projects around the corresponding lift cylinder 28 and generally encloses the basket telescoping cylinder 32.

The upper basket portion 30 has a shape which generally conforms to the shape of the inside of the lower basket portion 26 and is telescopingly received within the portion 26 for vertical movement with respect thereto between a lowered transport or shipping configuration (FIG. 2) and a raised field-working position (FIG. 3) wherein the cotton handling capacity of the basket 20 is substantially increased. The upper basket portion 30 includes a generally rectangularly shaped framework 84 with an open bottom and with sides generally closed by expanded metal screens indicated at 86. Transverse panels indicated at 88 extend from corner to corner on the opposite ends of the upper basket portion 30. A lid 90 is pivotally connected to the central portion of the framework 84 for rocking about a fore-and-aft extending pivotal axis indicated generally at 92 between a closed harvesting position (FIG. 3) and an open dump position (FIG. 4). In the harvesting position, the lid generally closes the dump side of the top of the basket.

Three fore-and-aft extending compacting augers 94, 96 and 98 are journalled for rotation in the upper portion of the rectangular framework 84 between the panel structure 88. As best seen in FIG. 4, the auger 98 is connected by brackets 102 to the lid 90 for movement therewith between the open and closed positions. When the lid is in the open position (FIG. 4) a cotton discharge opening indicated generally at 106 is defined, and the central compacting auger 96 is located closely adjacent the upper extremity of the opening.

The unloading conveyor 38 includes an upright conveyor frame 108 extending in the fore-and-aft direction substantially the length of the basket structure 20, and connected at its upper end to the framework 84 of the upper basket portion 30. The conveyor frame 108 is slidably received adjacent the beams 48 and 52 and the tube 54.

The conveyor frame 108 includes side frame members 112 connected by upper and lower fore-and-aft extending frame members 114 and by panel structure 116 which generally closes the area between the side frame members 112. The unloading conveyor 38 thus defines the sidewall of the basket 20 when the basket is in the field-working position (FIG. 3), and the lowermost extremity of the basket 20 when in the dump position (FIG. 4). The unloading conveyor 38 includes a slatted chain conveyor 118 which, as shown in FIG. 1, includes four linked chains trained around upper and lower sprockets 122 and 124 fixed to corresponding upper and lower sprocket shafts 126. The upper sprocket shaft 126 (FIG. 7) is drivingly connected to a hydraulic motor 128 which is operable when the basket is in the dump position as shown in FIG. 4 to drive the conveyor 118 during dumping of the basket.

Figure 2:
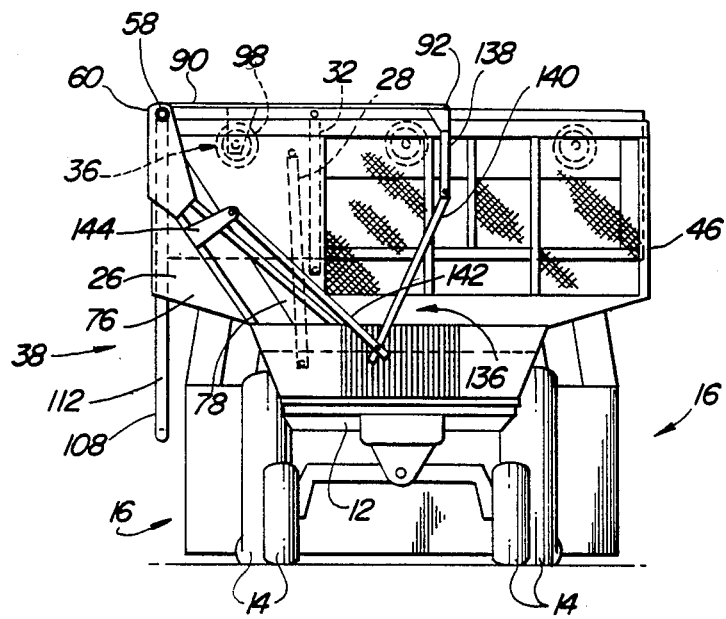
FIG. 2 is a rear view of the cotton harvester of FIG. 1 showing the upper basket portion telescoped relative to the lower basket portion to the storage or transport position.

The hydraulic basket telescoping cylinders 32 are connected at each end of the basket 20 to the lower basket portion 26 near the center of gravity of the portion 26. The cylinders 32 are plumbed in series to raise and lower in unison. Nylon glides 132 (FIG. 1) or other friction reducing elements are interposed at various locations between the upper basket portion 30 and the lower basket portion 26 to reduce friction between the portions so that the upper basket portion 30 can telescope smoothly with respect to the lower basket portion 26. In the transport position, the lower portion of the upright conveyor frame 108 actually projects downwardly below the side of the lower basket portion 26 (FIGS. 1 and 2). As the cylinders 32 are extended together, the conveyor frame 108 slides upwardly with respect to the side of the lower basket portion 26, and when the basket 20 reaches the fully extended field-working position (FIG. 3) the lowermost portion of the frame 108 is generally aligned with the bottom of the lower basket portion 26 at the dump side of the basket 20. The unloading conveyor 38 therefore defines the dump side sidewall when the basket 20 is in the extended position.

A collapsing lid opening linkage 136 is connected between the pivot mast 62 and the basket lid 90 to automatically open the lid to the position shown in FIG. 4 as the basket 20 is rocked toward the dump position. The linkage is articulated such that when the basket 20 is telescoped to the transport position (FIG. 2) the linkage can collapse downwardly without having to be disconnected. The linkage 136 includes a lever arm 138 fixed to and extending downwardly from the lid 90 at approximately a ninety degree angle. Pivotally connected to the lower end of the arm 138 is a first linkage 140 having a distal end pivotally connected to a first end of a second linkage 142. The distal end of the second linkage is pivotally connected to a bracket 144 which in turn is attached to the mast 62 below the basket pivot. As best seen in FIGS. 2-4, as the basket is extended to the field-working position, the second linkage 142 moves from a downwardly directed position to a generally horizontal position. As the basket is pivoted upwardly, the lid pivotal axis 92 moves away from the bracket 144 causing the linkages 140 and 142 to move toward a straightened position. When the unloading conveyor 38 reaches a generally horizontal position, the lever arm 138 is rotated in the clockwise direction about the pivotal axis 92 to rotate the basket lid 90 to an open position. As the basket is pivoted back to the field-working position of FIG. 3, the weight of the lid 90 moves the lid back to the closed position. A latch (not shown) or other structure may be utilized to secure the lid in the closed position so that the compacting auger 98 attached thereto can function to compress the cotton in the basket 20. Spring-loaded latches (not shown) or similar devices may also be provided near the basket corners to lock the upper and lower basket portions 30 and 26 relative to each other in the extended field-working position.

Figure 7:
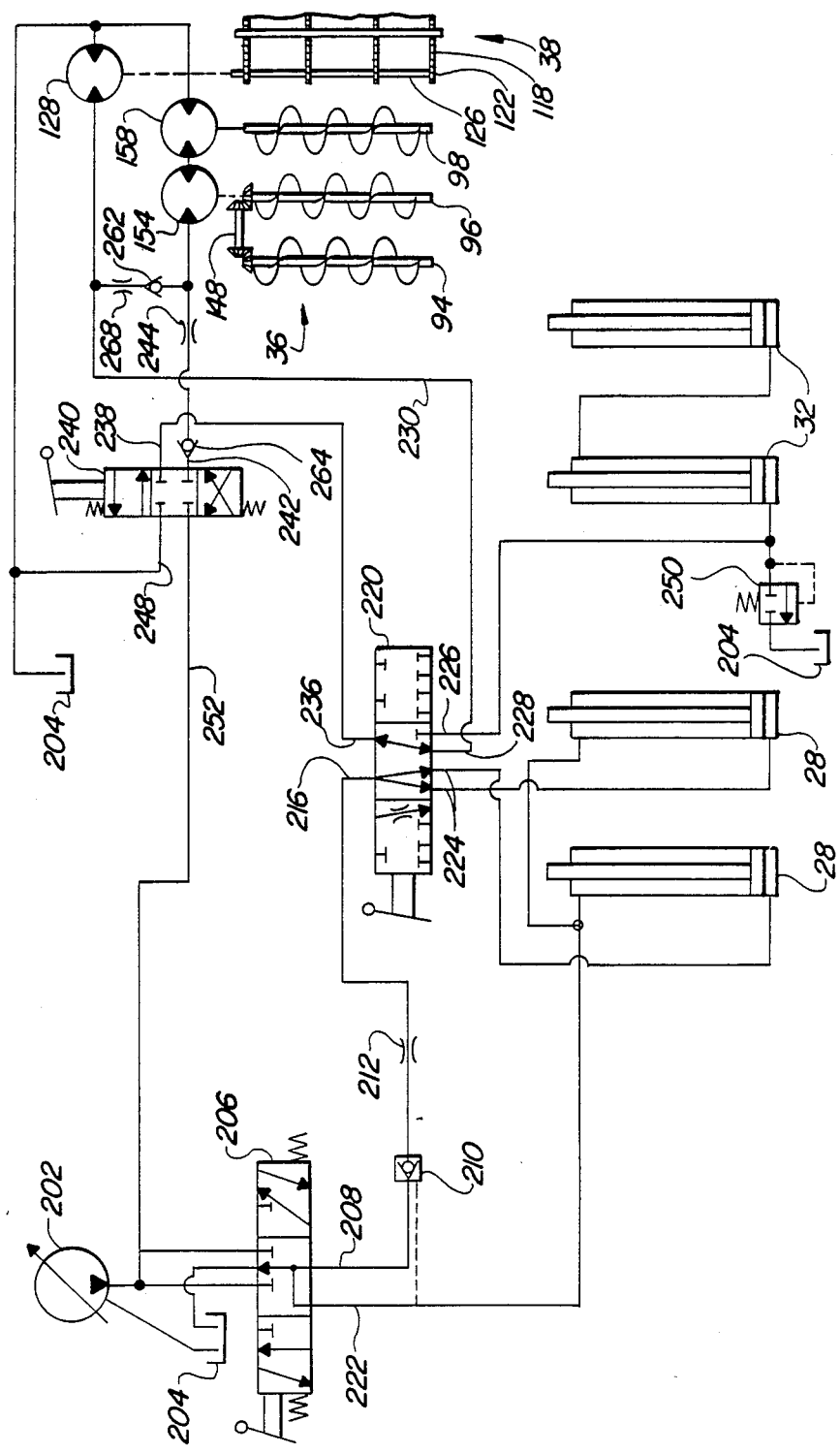
FIG. 7 is a schematic representation of the hydraulic circuit for controlling the basket lift and telescoping cylinders and the unloading conveyor and compacting augers.

The outboard compacting auger 94 and the central auger 96 are connected by a gear drive 148 and are driven by a first hydraulic motor 154 (FIG. 7). A second hydraulic motor 158 supported on the lid 90 for movement therewith is drivingly connected to the dump-side compacting auger 98. The second hydraulic motor 158 is connected in series with and downstream of the first hydraulic motor 154. As cotton is being harvested and directed into the basket by the air duct structure 18, the compacting auger structure 36 is driven by the hydraulic motors 154 and 158 to compress the cotton within the basket 20. In addition, when the basket is moved to the dump position of FIG. 4 and the chain conveyor is driven by the hydraulic motor 128, the compacting auger structure 36 is driven to help meter the cotton uniformly out of the basket into the module builder or other cotton-receiving structure. The central compacting auger located at the top of the discharge opening defined by the open lid 90 helps to meter the cotton uniformly from the basket 20. In addition, the dump-side compacting auger 98 on the lid 90 helps to break up any large clumps that might exit the opening 106. The compacting auger structure 36 in combination with the unloading conveyor 38 provide good unloading characteristics, even when the cotton is compacted tightly within the basket structure 20.

For optimum basket filling, the air duct structure 18 must deliver the cotton to the upper forward portion of the basket structure 20 when it is in the extended field-working position. As can be best appreciated from FIG. 4, the duct structure 18 must extend above the top of the cab structure 22 during the harvesting operations. The height of the duct structure 18, however, if left in the position shown in FIG. 4, would be higher than the remaining cotton harvester structure when the basket is telescoped to its transport or storage position. Therefore, to permit the height of the duct structure 18 to be reduced for transport, sliding support structure 164 (FIG. 5) is utilized with individual telescoping ducts 166. Each individual duct 166 includes a lower duct portion 168 telescopingly received within an upper duct portion 172, and the lower duct portions extend upwardly from the harvesting structure 16. The upper duct portions 172 are connected for vertical movement together by a transverse tube 174 which is movable vertically within slots 176 of the sliding support structure 164. The sliding support structure 164 is connected at the upper end of an upright frame member 178 (FIG. 5) located behind the cab 22. Each of the upper duct portions 172 is connected to the transverse tube 174 by a bracket 182 which permits the upper duct portion to rotate about both a generally transverse axis and a fore-and-aft extending axis to accommodate ductwork attitude changes. The support structure 164 includes a pair of transversely spaced upright supports 186 located behind the cab 22. Angle brackets 188 support the tube 174 and are slidably received over the respective upright supports 186. The supports 186 are apertured at vertically spaced locations 190, and spring-biased locking pins 192 are carried by the angle bracket 188 to selectively secure the upper duct portions in the raised or lowered positions, or in intermediate positions between the raised and lowered positions.

Figure 5:
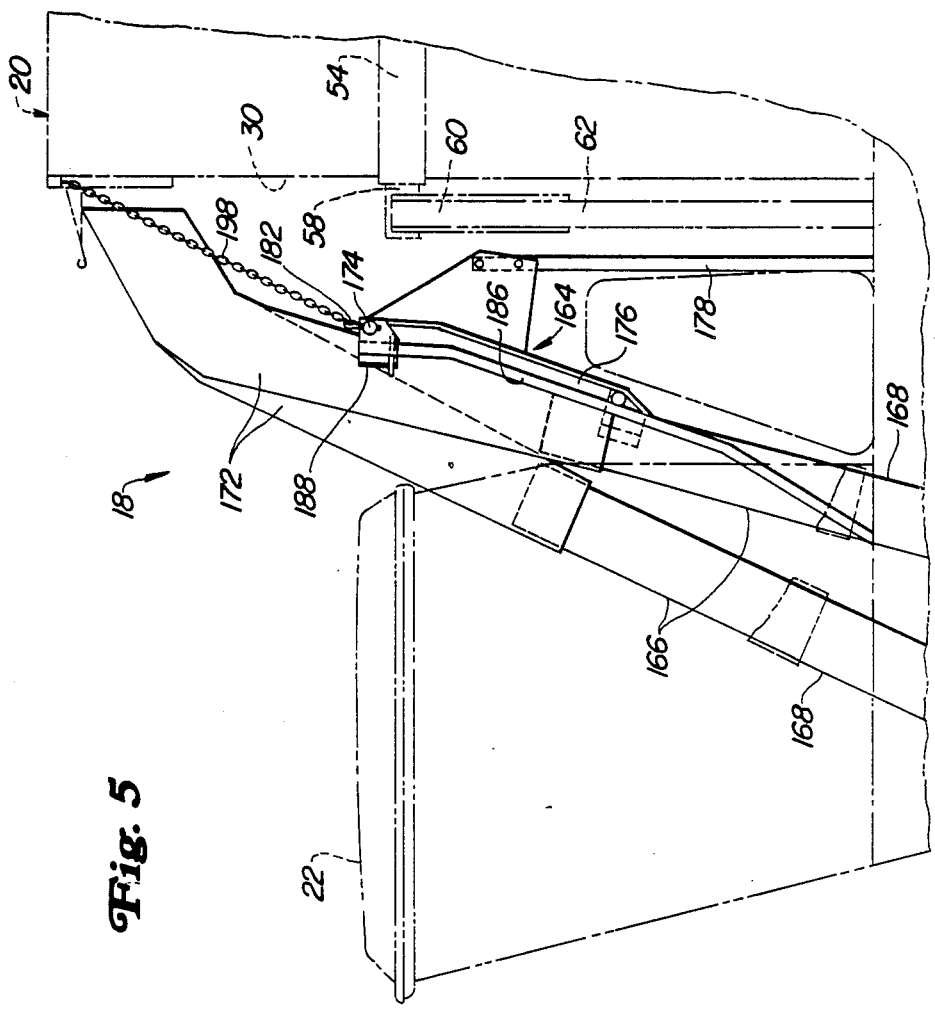
FIG. 5 is an enlarged side view of the telescoping cotton conveying ducts.

For transport or storage, the transverse tube 174 is slid to the lowermost portion of the slots 176 so that the upper duct portions are telescoped downwardly (see the solid lines of FIG. 1). To raise the upper duct portions 172 to the field-working position (broken lines of FIG. 1 and FIG. 5), a chain 198 is connected to the transverse tube 174 and to the forward upper edge of the upper basket portion 30. The locking pins 192 are pulled outwardly to a release position, and the operator then activates the hydraulic basket telescoping cylinders 32 to telescope the upper basket portion 30 upwardly relative to the lower basket portion 26. The transverse tube 174 is pulled upwardly in the slots 176 by the chain 198 and moves the upper duct portions to their field-working position as shown in FIG. 5 wherein the open ends of the duct portions 172 are aligned with corresponding openings in the front wall of the upper basket portion 30. The locking pins 192 are then released to secure the upper duct portions in the field-working position, and the chain 198 is disconnected from between the tube 174 and the upper basket portion 30. To lower the upper duct portions 172, the chain 198 is reattached to the tube 174 and the upper basket portion 30, and the locking pins 192 are released. Thereafter, the cylinders 32 are retracted to lower the upper basket portion 30, and the tube 174 is allowed to slide down the slots 176 with the lowering of the upper basket portion 30. The upper duct portions 172 telescope downwardly over the lower duct portions 166.

Referring now to FIG. 7, the hydraulic circuit for operating the basket lift cylinders 28, the telescoping cylinders 32 and the compacting auger structure 36 and unloading conveyor 38 will be discussed in detail. A source of hydraulic fluid under pressure 202 and a reservoir 204 are located on the cotton harvester 10 and are connected in a conventional manner to an operator control valve 206 located in the harvester cab 20. The operator control valve 206 includes a first output port 208 connected through a pilot operated check valve 210 and a flow restrictor 212 to a first input port 216 on a rotary diverter/lock valve 220. The operator control valve 206 includes a second output port 222 connected to the rod end of the basket lift cylinders 28. The rotary valve 220 includes a pair of output ports 224 connected to the base ends of the cylinders 28. A third output port 226 of the valve 220 is connected to the base end of one of the basket telescoping cylinders 32. The rod end of the same cylinder 32 is connected to the base end of the second cylinder 32 so that the cylinders operate together in series. A fourth output port 228 of the valve 220 is connected by a flexible conduit 230 to the hydraulic conveyor motor 128. The rotary valve 220 also includes a second input port 236 which is connected to a first port 238 of a compactor-conveyor control valve 240. The valve 240 includes a second port 242 connected through a flow restrictor 244 to the hydraulic motor 154 which drives the compacting augers 94 and 96. The valve 240 includes a third port 248 connected to the reservoir 204. A fourth port 252 is connected to the source of fluid under pressure 202.

The hydraulic motor 158 driving the compacting auger 98 is connected in series via flexible conduits between the hydraulic motor 154 and the reservoir 204. A one-way check valve 262 is connected between the line 230 and the input to the motor 154. Another check valve 264 is connected between the port 242 and the input to the motor 154. A flow restrictor 268 is connected in series with the valve 262.

The diverter/lock valve 220 permits the operation of the basket lift cylinders 28 from the operator control valve 206 and the telescoping cylinders 32 from the valve 240 without additional control systems. The valve 220 also assures that when the telescoping cylinders 32 are operating, the basket lift cylinders 28 are locked against operation. When the valve 220 is moved to the left-most position as viewed in FIG. 7, all the systems are locked against operation to facilitate service or maintenance of the harvester. When the diverter/lock valve 220 is in the position shown in FIG. 7, the operator control valve 206 controls the basket lift cylinders 28, and fluid flow between the fourth output port 228 and the second input port 236 of the valve 220 is facilitated. To move the basket 20 to the dump position, the operator moves the control valve 206 to the left to direct fluid flow to the port 208, through the check valve 210 and restrictor 212 and to the output ports 224 to extend the cylinders 28. At the same time, the output port 226 is blocked so that the hydraulic basket telescoping cylinders 32 cannot be operated. With the rotary valve 220 in the position shown in FIG. 7, the operator may also move the valve 240 upwardly from the lock position shown to pressurize the port 238 and direct fluid under pressure through the input port 236 and output port 228 of the valve 220 to the conveyor motor 128 to drive the discharge conveyor 118. The check valves 262 and 264 divert some of the fluid flow from the line 230 through the auger motors 154 and 158 to rotate the augers 94, 96 and 98 during dumping to facilitate uniform discharge of cotton from the basket opening 106.

To move the basket 20 from the dump position in FIG. 4 back into the harvest position of FIG. 3, the rotary valve 220 is positioned as shown in FIG. 7, and the operator control valve 206 is moved to the rightmost position to thereby pressurize the port 222 and return the port 208 to reservoir. The check valve 210 is opened to permit the cylinders 28 to retract as fluid flows from the cylinders through the output ports 224 to the input port 216. The restrictor 212 controls the rate at which the basket will pivot back towards the field-working position.

As cotton is being harvested and directed through the duct structure 18 into the upper portion of the basket 20, the operator may move the valve 240 to the lowermost position as viewed in FIG. 7 to direct fluid flow from the port 252 through the compactor auger motors 154 and 158 to rotate the augers 94, 96 and 98 and compress the cotton within the basket. The rotary valve 220 prevents operation of the unloading conveyor 118 unless the dump function is selected by positioning the valve 220 in the central position as shown in FIG. 7.

To operate the hydraulic basket telescoping cylinders 32, the operator positions the rotary valve 220 in the right-most position so that the output port 228 is connected with the input port 236. Thereafter, the operator moves the operator valve 240 up to pressurize the line 208 from the port 252 and direct fluid through the valve 220 into the base end of the first cylinder 32. As the first cylinder 32 extends oil is forced from the rod end of the first cylinder 32 into the base end of the second cylinder 32 to cause the cylinders to extend in unison and raise the upper basket portion 30 to the extended position. Once the basket is in the extended position, the upper basket portion 30 may be locked relative to the lower basket portion 26. To telescope the basket 20 to the lowered transport or storage position, the latches are released and the valve 220 is moved to the right-most position as shown in FIG. 7. The valve 240 is then moved down to open the port 238 to reservoir through the port 248 so that fluid moves from the first cylinder 32 through the restrictor in the valve 220 and through the valve 240 into the reservoir 204. When the valve 220 is in the right-most position as viewed in FIG. 7, fluid flow is blocked to the basket lift cylinders as well as to the hydraulic conveyor motor 128. A pressure relief valve 250 is connected between the first cylinder 32 and reservoir to prevent excessive pressure in the telescoping circuit.

Having described the preferred embodiment, it will be apparent that modifications can be made without departing from the scope of the invention as defined in the accompanying claims.

We claim:

1. In a cotton harvester having a main frame and harvesting structure for removing cotton from plants, cotton basket structure for receiving the removed cotton comprising: a lower basket portion movably mounted on the main frame, a first actuator for moving the basket relative to the frame between dump and harvesting positions, an upper basket portion telescopingly received by the lower basket portion, a second actuator for moving the upper basket portion relative to the actuator for moving the upper basket portion relative to the lower basket portion between an extended field-working position and a retracted storage position, operator control means for actuating a selected one of the first and second actuators, wherein the first actuator comprises a hydraulically actuated lift motor and the second actuator comprises a hydraulically actuated telescoping motor, and the operator control means includes valve structure for actuating a selected one of the motors and preventing simultaneous operation of the other one of the motors.

2. In a cotton harvester having a main frame and harvesting structure for removing cotton from plants, cotton basket structure for receiving the removed cotton comprising: a lower basket portion movably mounted on the main frame, a first actuator for moving the basket relative to the frame between dump and harvesting positions, an upper basket portion telescopingly received by the lower basket portion, a second actuator for moving the upper basket portion relative to the lower basket portion between an extended field-working position and a retracted storage position, operator control means for actuating a selected one of the first and second actuators and further including an unloading conveyor connected to the upper basket portion for movement therewith.

3. The invention as set forth in claim 2 wherein the unloading conveyor is fixed to and moves with the upper basket portion as the upper basket portion telescopes relative to the lower basket portion.

4. The invention as set forth in claim 3 wherein the lower basket portion has a sidewall movable between an upright position corresponding to the harvest position and a generally horizontal position corresponding to the dump position, and the unloading conveyor is parallel to and movable with respect to the sidewall.

5. The invention as set forth in claim 2 including a hydraulic motor drivingly connected to the conveyor, a conveyor valve connected to the motor and to a source of hydraulic pressure on the harvester for selectively driving the motor, and wherein the operator control means includes a basket control valve connected to the source of hydraulic pressure and the conveying motor, said basket control valve movable to a basket telescoping position for telescoping the basket portions and preventing operation of the hydraulic motor while the basket portions telescope.

6. In a cotton harvester having a main frame and harvesting structure for removing cotton from plants, cotton basket structure for receiving the removed cotton comprising: a lower basket portion movably mounted on the main frame, a first actuator for moving the basket relative to the frame between dump and harvesting positions, an upper basket portion telescopingly received by the lower basket portion, a second actuator for moving the upper basket portion relative to the lower basket portion between an extended field-working position and a retracted storage position, operator control means for actuating a selected one of the first and second actuators, and compacting augers rotatably mounted in the upper basket portion for movement therewith with respect to the lower basket portion.

7. The invention as set forth in claim 6 wherein the upper basket portion includes a movable lid, means for moving the lid between an open dumping position defining a cotton discharge opening and a closed harvesting position, and wherein at least one of the compacting augers is supported by the lid for movement therewith between a compacting position and a metering position corresponding to the closed position and the open position, respectively, of the lid.

8. The invention as set forth in claim 7 wherein a second one of the compacting augers is located adjacent the discharge opening, and means for rotating said second one of the augers when the basket is in the dump position.

9. In a cotton harvester having a main frame and harvesting structure for removing cotton from plants, cotton basket structure for receiving the removed cotton comprising: a lower basket portion movably mounted on the main frame, a first actuator for moving the basket relative to the frame between dump and harvesting positions, an upper basket portion telescopingly received by the lower basket portion, a second actuator for moving the upper basket portion relative to the lower basket portion between an extended field-working position and a retracted storage position, operator control means for actuating a selected one of the first and second actuators, an operator control valve connected to a source of fluid under pressure on the harvester, and a lock valve connected between the control valve and the first and second actuators for selecting one of the actuators to be controlled by the control valve.

10. The invention as set forth in claim 9 including a motor-actuated conveyor connected to the basket, and means for preventing actuation of the conveyor when the second actuator is selected by the lock valve.

11. In a cotton harvester having a main frame and harvesting structure for removing cotton from plants, cotton basket structure for receiving the removed cotton comprising: a lower basket portion movably mounted on the main frame, a first actuator for moving the basket relative to the frame between dump and harvesting positions, an upper basket portion telescopingly received by the lower basket portion, a second actuator for moving the upper basket portion relative to the lower basket portion between an extended field-working position and a retracted storage position, operator control means for actuating a selected one of the first and second actuators and wherein the first and second actuators comprise basket lift and basket telescoping hydraulic cylinders, respectively, the control means includes an operator control valve connected to a source of hydraulic fluid on the harvester, and a lock valve connected to the control valve and to the basket lift and telescoping cylinders for preventing simultaneous actuation of the basket lift and basket telescoping cylinders.

12. In a cotton harvester having a main frame and collapsible basket structure supported by the frame:
 a first hydraulic actuator for moving the basket structure between field-working and dump positions; and
 a second hydraulic actuator for moving the basket structure between an extended cotton receiving position and a collapsed transport position, and
 a hydraulic control circuit comprising:
  a source of hydraulic fluid under pressure and a fluid reservoir;
  an operator control valve having an inlet connected to the source and the reservoir, and an outlet, said control valve movable between a first position wherein fluid under pressure is communicated to the outlet and a second position wherein the outlet is connected to the reservoir;
  a basket control valve having an input port connected to the output port of the operator control valve, a first output port connected to the first hydraulic actuator, a second output port connected to the second actuator, said basket control valve movable between a first position wherein the input port is connected to the first output port for providing a fluid path between the control valve outlet and the first hydraulic actuator while locking out fluid flow to the second hydraulic actuator, and a second position wherein the second output port is connected to an independently controlled source of fluid, and means for moving the basket control valve between the first and second positions to thereby select one of the hydraulic actuators to be controlled by the operator control valve.

13. The invention as set forth in claim 12 including a basket conveyor, an operable hydraulic motor for driving the conveyor when the basket is in the dump position, and motor control means operably connected to the motor and to the basket control valve.

14. The invention as set forth in claim 13 wherein the motor control means includes a conveyor valve connected to the source, said motor control means also comprising the independently controlled source of fluid.

15. The invention as set forth in claim 13 including a hydraulically driven basket compactor and means for operating the compactor when the basket control valve is in the first position.

16. The invention as set forth in claim 15 wherein the means for operating the basket compactor includes a hydraulic compactor motor connected to the conveyor valve.

17. The invention as set forth in claim 12 wherein the basket structure comprises upper and lower telescoping portions, and the first actuator comprises first and second hydraulic cylinders connected in parallel and the second actuator comprises third and fourth cylinders connected in series.

18. The invention as set forth in claim 12 wherein the basket control valve comprises a three position valve and is movable to a third position wherein fluid flow is blocked to both the first and second actuators.

19. The invention as set forth in claim 18 wherein the basket structure includes a drivable unloading conveyor, and means for preventing the driving of the unloading conveyor when the basket control valve is in the second or third positions.

20. In a cotton harvester having a main frame and harvesting structure for removing cotton from plants, cotton basket structure for receiving the cotton, comprising:
 a basket including a first basket portion connected to the main frame, and a second basket portion having upright sidewalls and movable vertically with respect to the first basket portion between a lowered transport position and a raised harvesting position;
 an unloading conveyor connected to one of the sidewalls of the second basket portion for movement vertically therewith; and
 means for rocking the basket, with the second basket portion in the raised position, between a first loading position wherein the conveyor is upright and a dump position wherein the unloading conveyor is substantially horizontal.

21. The invention as set forth in claim 20 wherein the unloading conveyor projects vertically below the first basket portion when the second basket portion is in the lowered transport position.

22. The invention as set forth in claim 21 wherein, when the basket is in the dump position, the unloading conveyor extends substantially over an area of the basket defining the lowermost extremity of the basket in the dump position.

23. The invention as set forth in claim 20 including a compacting auger connected to the second basket portion, and means for driving the auger to compact cotton in the basket when the basket is in the loading position.

24. The invention as set forth in claim 23 wherein the basket includes a discharge area located above and to one side of the conveyor when the basket is in the dump position, and the auger is located adjacent the discharge area; and means for driving the auger when the basket is in the dump position to meter cotton onto the conveyor.

25. In a cotton harvester having a main frame and harvesting structure for removing cotton from plants, cotton basket structure for receiving the cotton, comprising:
 a basket including a first basket portion connected to the main frame, and a second basket portion having upright sidewalls and movable vertically with respect to the first basket portion between a lowered transport position and a raised harvesting position;
 cotton conveying ductwork extending upwardly and rearwardly from the harvesting structure, said ductwork including upper and lower duct sections telescopingly connected;

means for moving the upper duct section vertically relative to the lower duct section between a retracted position corresponding to the transport position of the second basket portion and an extended position corresponding to the harvesting position of the second basket portion; and means connecting the upper duct section for movement vertically with the second basket portion.

26. The invention as set forth in claim 25 including first and second upper and lower mating duct sections, and means connecting the first and second upper duct sections for movement vertically in unison between the retracted and extended positions.

27. In a cotton harvester having a main frame and harvesting structure for removing cotton from plants, cotton basket structure for receiving the cotton, comprising:

a basket including a first basket portion connected to the main frame, and a second basket portion having upright sidewalls and movable vertically with respect to the first basket portion between a lowered transport position and a raised harvesting position;

cotton conveying ductwork extending upwardly and rearwardly from the harvesting structure, said ductwork including first and second upper and lower mating duct sections telescopingly connected;

means for moving the upper duct section vertically relative to the lower duct section between a retracted position corresponding to the transport position of the second basket portion and an extended position corresponding to the harvesting position of the second basket portion;

means connected the first and second upper duct sections for movement vertically in unison between the retracted and extended positions; and wherein the means connected the upper duct sections comprises a beam extending between the upper duct sections, and a bracket connected to the main frame slidingly receiving the beam for vertical movement with respect to the frame.

28. Cotton harvester basket structure and hydraulic control circuitry therefor, comprising:

a cotton-receiving basket having first and second basket portions connected for movement relative to each other between a first compact position and a second extended position;

a first hydraulic actuator connected to the basket for moving the basket portions relative to each other between the first and second positions;

a basket support and means connecting the basket to the support for movement with respect to the support between a field-working position and a dump position;

a second hydraulic actuator connected to the basket for moving the basket between the field-working and dump positions;

first and second operator control valves; and a diverter valve having first and second input ports connected to the first and second control valves, respectively, and first and second output ports connected to the first and second actuators, respectively, said diverter valve including means for selectively connecting the first output port to the first operator control valve and the second output port to the second operator control valve.

29. The invention as set forth in claim 28 wherein the diverter valve includes means for preventing simultaneous operation of the first and second actuators.

30. The invention as set forth in claim 28 wherein the diverter valve is a multi-position valve having a first position for operating the first actuator from the first operator control valve, a second position for operating the second actuator from the second operator control valve, and a third position for preventing operation of either of the actuators.

31. The invention as set forth in claim 30 further including at least one hydraulic motor supported by the basket, and wherein the second operator control valve is operably connected to the hydraulic motor.

32. The invention as set forth in claim 31 wherein the diverter valve includes means for preventing operation of the hydraulic motor when the diverter valve is in a preselected one of the three positions.

* * * * *

UNITED STATES PATENT AND TRADEMARK OFFICE
CERTIFICATE OF CORRECTION

PATENT NO. : 4,930,297

DATED : 5 June 1990

INVENTOR(S) : Francis Edward Schlueter et al.

It is certified that error appears in the above-identified patent and that said Letters Patent is hereby corrected as shown below:

In col. 9, lines 39 and 40, delete "the actuator for moving the upper basket portion relative to".

In col. 13, line 37, delete "connected" and insert -- connecting -- and line 40, delete "connected" and insert -- connecting --.

Signed and Sealed this

Thirteenth Day of August, 1991

Attest:

HARRY F. MANBECK, JR.

*Attesting Officer*  *Commissioner of Patents and Trademarks*